United States Patent

Jones

[15] 3,709,261
[45] Jan. 9, 1973

[54] THREAD PROTECTOR FOR THREADED PIPE SECTION ENDS OR THE LIKE

[72] Inventor: Lynn G. Jones, Downey, Calif.

[73] Assignee: Global Marine Inc., Los Angeles, Calif.

[22] Filed: Sept. 10, 1970

[21] Appl. No.: 70,998

[52] U.S. Cl..............138/96 T, 138/96 T, 138/89.4
[51] Int. Cl...................F16l 57/00, B65d 59/06
[58] Field of Search...138/96, 96 T, 89.1, 89.2, 89.3, 138/89.4

[56] References Cited

UNITED STATES PATENTS

| | | | |
|---|---|---|---|
| 994,880 | 6/1911 | Shrum | 138/89.4 X |
| 1,353,125 | 9/1920 | Currie | 138/89.4 |
| 1,373,092 | 3/1921 | Norton | 138/89.4 |
| 1,406,133 | 2/1922 | Wright | 138/89.4 |
| 1,432,613 | 10/1922 | Orr | 138/89.2 |
| 1,721,364 | 7/1929 | Westerman | 138/96 T X |
| 1,786,491 | 12/1930 | Hunter | 138/96 T |
| 2,365,888 | 12/1944 | Linderfelt | 138/96 R |
| 2,551,834 | 5/1951 | Ferguson | 138/96 T |
| 3,485,271 | 12/1969 | Halsey | 138/96 T |
| 3,240,232 | 3/1966 | Matherne | 138/96 T |
| 2,263,223 | 11/1941 | Protin | 138/96 T |
| 3,038,502 | 6/1962 | Hank | 138/96 T |

FOREIGN PATENTS OR APPLICATIONS

| | | | |
|---|---|---|---|
| 672,432 | 10/1963 | Canada | 138/96 T |

Primary Examiner—Herbert F. Ross
Attorney—Christie, Parker & Hale

[57] ABSTRACT

A thread protector for the male threaded end of a length of oil well drill pipe includes a socket having a recess adapted to receive the male threaded end of a drill pipe. Tooth means are carried by the socket within the recess for locking the pipe end within the recess by engaging the threads of the pipe end about only a portion of the circumference of the pipe. The tooth means are biased relative to the socket into the recess. Means are defined in the socket for enabling the disengagement of the tooth means, against the bias thereof, from the threads. The protector is slid axially over the pipe end with the tooth means riding along the threads until the latter is within the socket recess. The protector is then restrained from slipping off the pipe by the biased engagement of the tooth means with the threads. To remove the protector, the tooth means are moved against their bias to disengage the tooth means from the threads so the protector can be removed axially from the end of the pipe.

9 Claims, 6 Drawing Figures

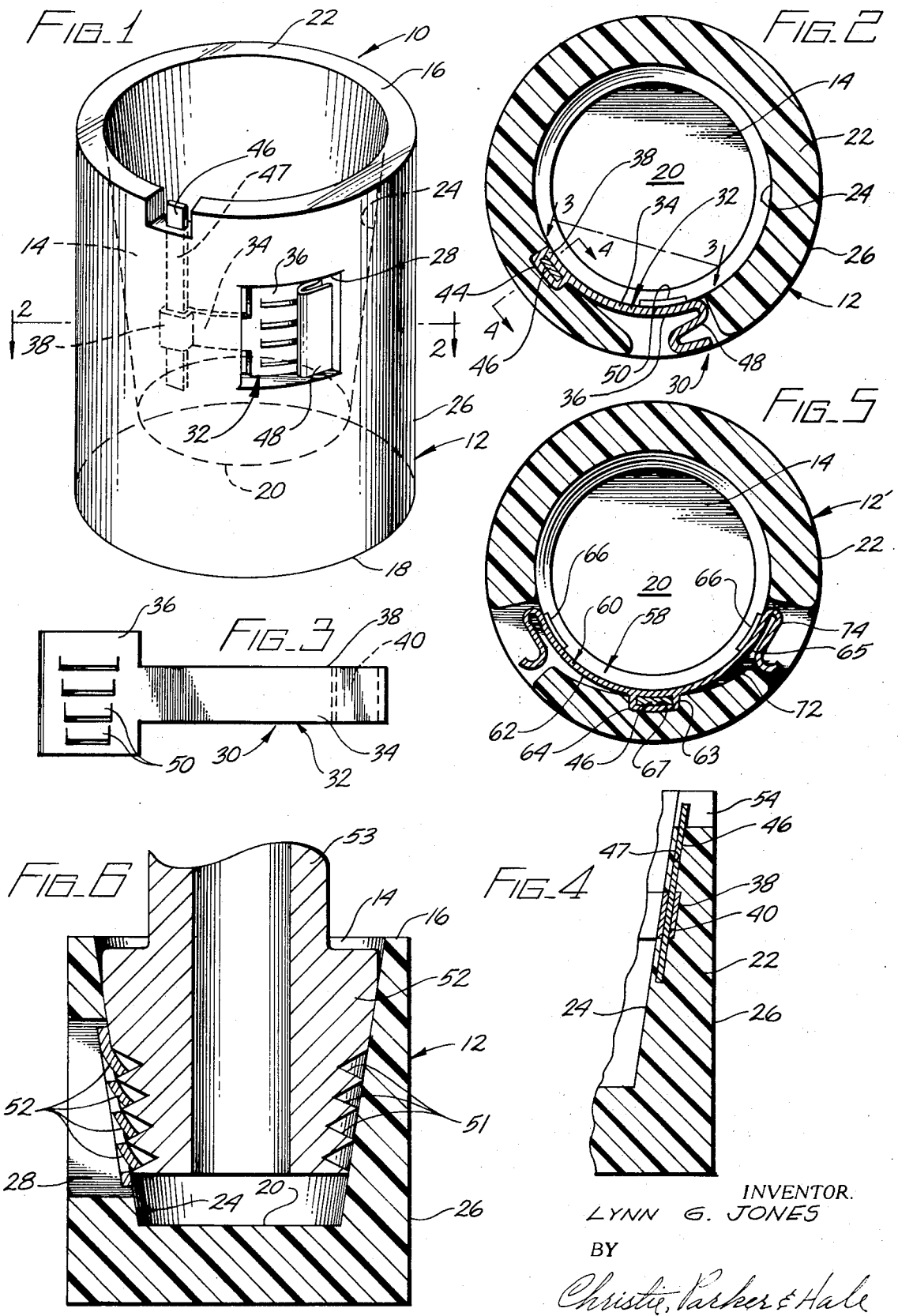

THREAD PROTECTOR FOR THREADED PIPE SECTION ENDS OR THE LIKE

BACKGROUND OF THE INVENTION

1. Field of the Invention

This invention relates to protecting the threads on an end of a length of pipe or the like. More specifically, the invention relates to a thread protector which is readily affixable and removable from the threads to be protected by movement only axially of the pipe.

2. Description of the Prior Art

In oil and gas drilling operations, whether conducted on land or at offshore locations, a drill string of desired length is formed by screwing the threaded male end of a length of drill pipe into a corresponding female end of another length of drill pipe; this process is repeated as many times as necessary to define the desired drill string which extends from a drill bit, at its lower end in the well being drilled, to and through a rotary table (provided to rotate the drill string and thereby operate the drill bit) located in a suitable drilling rig positioned above the top of the well. The drilling rig conventionally includes a derrick from which the drill string is suspended during drilling operations, the suspended drill string passing through the rotary table mounted in the floor of the drilling rig.

The term "drill string" is used to describe the entire length of drill pipe between the drill bit and the rotary table. Short increments of drill string defined by, say, three lengths of drill pipe, are referred to as "stands." Drill pipe resembles conventional steel pipe except that it has an extremely large wall thickness to enable the drill string to transmit the high levels of torque necessary to operate the drill bit along the length of the drill string between the rotary table and the drill bit. Individual lengths of drill pipe conventionally are fabricated to be about 30 to 40 feet long. Individual stands of drill pipe, therefore, are approximately 90 to 110 feet long.

In drilling operations carried out on land, drill pipe stands conventionally are stored vertically within the derrick; in drilling from a floating vessel, only one or two stands are stored in the derrick, the remaining stands being stored horizontally along or over the deck of the drilling vessel adjacent the drill rig which usually is located over a drilling well formed through the center of the vessel. On floating drilling vessels, the majority of the drill pipe not actually being used is stored horizontally as close to the hull of the vessel as possible to lower the center of gravity of the loaded vessel as much as possible, thereby keeping the vessel as stable as possible.

The pipe couplings (also known as "joints") for interconnecting individual lengths of drill pipe conventionally incorporate external threads on the male component of the coupling and internal threads on the female component. These threads are very precisely defined, usually along a taper rather than along a cylinder, because of the substantial torque which must be transmitted during the drilling operation through the connected coupling. The male threads are particularly susceptible to damage. Damage to the threads of the pipe joints is to be avoided to minimize the possibility of cross-threading at the time the joints are being made up, and also to maximize the amount of torque which the assembled joint may transmit.

The precision with which the threads of the drill pipe joints are defined suggests that the drill pipe lengths should be handled carefully at all times. As a practical matter, however, the drill pipe lengths are subjected to considerable rough handling and abuse; some of the personnel usually employed in oil drilling operations are aptly referred to as "roughnecks." Also, the drilling of an oil well is an expensive process and therefore speed in the performance of all operations which do not directly advance the depth of the well is desired, and such operations are in fact carried out as rapidly as possible. More often than not, the operations which do not advance the depth of the well involve the connection or disconnection of drill pipe stands from the drill string, as when a worn drill bit must be replaced by a new drill bit; such a process requires complete removal of the drill string, which may be several thousand feet long, from the well hole.

Conventionally, the lower end of a stand being removed from or added to a drill string is defined by the male component of a coupling. Because of the manner in which pipe stands are usually handled, there is considerable likelihood that the threads of such coupling component may be damaged as the stand is removed from or added to the drill string. This likelihood is increased when drilling operations are performed on a floating drilling vessel since the stand, after removal from the drill string, is returned to the horizontal pipe racking location by a process in which male coupling component is subjected to particularly severe abuse.

As shown in U.S. Pat. No. 3,083,842, as the pipe stand is removed from the upper end of the drill string it is suspended in the derrick over the rotary table in which the upper end of the drill string is held. The lower end of the suspended stand is then swung forwardly in the derrick into engagement with a truck-like skate which travels on a rail back and forth along the length of the vessel to move pipe stands to and from the horizontal pipe racker which is located on either side of the rail forward of the derrick over the main deck of the drilling vessel. To move the suspended stand into position into the racking mechanism, the skate is disposed adjacent the drilling rig and the lower end of the pendulously supported stand is placed onto the skate. As the upper end of the pendulously supported stand is lowered, the skate is moved forward so that the stand is gradually moved into a horizontal position, after which it is moved by the skate into position into the racking mechanism.

It is apparent that in this transition between a vertical position and a horizontal position, the lower end of the stand is subjected to severe loads by reason of its engagement with the skate. Similar loads are experienced as a horizontal pipe stand is moved from the racking mechanism into a vertical position in the derrick during the process of making up a drill string. Therefore, unless the threads of the male component of the pipe coupling, carried by the lower end of the pipe stand, are given some protection, such threads very easily may be damaged during normal handling of the drill pipe.

In view of the great likelihood that the threads of a male drill pipe coupling may be damaged by reason of the rough handling to which the pipe lengths are subjected, it is known to provide thread protectors for the male threads of the coupling. Heretofore, such thread protectors have been provided in the form of sheet metal cans which are formed, as by spinning, to define internal threads which mate with the external threads of the male coupling component. These existing thread protectors are essentially sheet metal sheaths for the male threads and protect such threads from damage by abrasion and from light to moderate impact. The disadvantage of these existing protectors is that they are made of sheet metal and are easily deformed themselves. Once deformed, the existing protectors are not reusable.

The existing thread protectors normally are installed on the male coupling components by the manufacturer of the drill pipe and are removed from the coupling the first time the pipe length is made up into a stand or drill string; since this operation normally occurs at the drilling rig, such protectors usually are merely thrown aside by the personnel working on the drill rig and are either lost or damaged so that they cannot be re-used. It is a rare situation where existing thread protectors are carefully collected and preserved for re-use. Existing thread protectors are relatively expensive to fabricate.

Moreover, existing thread protectors can be connected to or removed from the treads they protect only by screwing the protector on and off the thread. The screwing process is time consuming and is not favored by the personnel called upon during drilling operations to remove and install the protectors. The result is that the structure and inherent mode of operatoin of existing thread protectors contributes substantially to the situation described above, namely, that the protectors, once removed from the protecting threads, are not regularly reused.

SUMMARY OF THE INVENTION

This invention provides an improved, economical and efficient thread protector for use in protecting the external threads purely by motion axially along the protected threads. That is, the protector need not be screwed onto or off of the protected threads. The protector is almost instantly connectable to the threads, and removal of the protector from the protected threads requires only slightly more time. The protector provides substantially enhanced protection of the protected threads from damage by impact of significant magnitude. Also, the improved protector may be made buoyant so that should the protector inadvertently be lost over the side of a floating drilling vessel, the protector may be recovered for subsequent use. If damaged, those proportions of the present protector which function to retain the protector on the protected threads may be repaired or replaced readily in the field. A substantial portion of the structure of the present protector is not dependent upon the precise profile of the threads with which the protector is to be used; therefore, the present protector may be manufactured very economically to cooperate with threads of different profile.

Generally speaking, this invention provides an improved apparatus for protecting external threads on the end of a pipe section or the like, and includes a socket member which defines therein a recess adapted to receive a threaded end of a pipe section. Tooth means are carried by the socket adjacent the recess for engaging the external threads of a pipe section received in the recess about only a fractional portion of the circumference of such pipe section. The tooth means function to retain the socket member to a pipe section having its end disposed in the recess. The apparatus also includes means which cooperate between the socket member and the tooth means to mount the tooth means to the socket member for movement toward and away from the recess and to bias the tooth means into the recess.

DESCRIPTION OF THE DRAWINGS

The above mentioned and other features of the present invention are more fully set forth in the following detailed description of certain illustrative embodiments of the invention, which description is presented with reference to the accompanying drawing in which:

FIG. 1 is a perspective view of a thread protector in accord with the present invention;

FIG. 2 is a cross-sectional plan view of the thread protector of FIG. 1;

FIG. 3 is a front elevation view of the spring clip assembly taken along line 3—3 in FIG. 2;

FIG. 4 is a cross-sectional view taken along lines 4—4 of FIG. 2;

FIG. 5 is a cross-sectional plan view, similar to that of FIG. 2, of another thread protector in accord with the present invention; and FIG. 6 is a cross-sectional view of the thread protector engaged with the male component of a length of drill pipe.

DESCRIPTION OF THE ILLUSTRATED EMBODIMENTS

FIG. 1 shows a thread protector 10 of the present invention. Protector 10 is defined by a cylindrical housing or socket member 12 having a conical recess 14 defined therein. Specifically, recess 14 is in the form of a truncated cone extending from a maximum diameter at an open upper end 16 of the socket member to a minimum diameter adjacent a closed lower end 18 of the socket member. The lower extremity of recess 14 is defined at a circular floor 20 which is parallel to and spaced apart from socket member lower end 18. Socket member 12 is further defined by side walls 22 having an inner surface 24 bounding recess 14 and an outer right circular cylindrical surface 26 extending between upper end 16 and lower end 18.

Referring now to FIGS. 1 and 2, an aperture 28 is formed through socket side walls 22 about midway along the depth of recess 14. The aperture is tapered from a maximum transverse dimension (i.e., a dimension circumferentially of recess 14) along recess surface 24 to a minimum transverse dimension along socket member outer surface 26. The tapered effect of aperture 28, as defined by the bounding segments of housing side walls 22, is an important feature of the present invention for the reasons below described.

As best shown in FIGS. 1–3, a spring clip assembly 30 is defined mainly by a plate 32 of spring steel; the major portion of plate 32 has a radius of curvature equal to or slightly less than the radius of curvature of recess inner surface 24 at the location of aperture 28 along the recess. Plate 32 includes a narrow elongate flexing arm portion 34 of substantially rectangular configuration and a contiguous tooth portion 36 of substantially square-shaped configuration (see FIG. 3); both portions 34 and 36 conform to the above mentioned curvature which approximates a radius of curvature equal to that of the recess of inner surface 24. A thickened boss 38 is formed at the end of arm portion 34 opposite from portion 36. An aperture 40 is formed through boss 38 perpendicular to the length of arm portion 34 and generally parallel to the basic plane of plate 32 as defined by portions 34 and 36 thereof. As shown in FIG. 2, aperture 40 preferably has a rectangular cross-sectional configuration of greater extent parallel to the length of arm portion 34 than normal to the length of the arm portion of plate 32. Boss 38 extends laterally of a convex outer surface 42 of plate 32 and is adapted to be fittingly engaged within a corresponding recess 44 formed into side wall 24 of recess 14 adjacent aperture 28.

Proceeding circumferentially of recess 14 from recess 44 to the adjacent edge of aperture 28, socket member side wall 22 is relieved from recess 14, thereby defining the tapered aspect of aperture 28 as shown in FIG. 2. A keeper bar 46 for clip assembly 30 is adapted to be received within a mating passage 47 formed in socket member side wall 22 in such a location as to traverse recess 44. That is, passage 47 is formed in the socket member to extend parallel to the depth of recess 14 from an upper end open to end surface 16 of the socket member to a lower closed end in side wall 22 of the socket member below recess 44; when boss 38 of clip assembly 30 is properly nested in recess 44, passage 47 and boss aperture 40 are aligned. The configuration, in cross-section, of passage 47 essentially matches that of boss aperture 40. Keeper bar 46 has a length corresponding to the length of passage 47 from socket member upper surface 16 and is configured to mate snugly in passage 47 and boss aperture 40 of clip assembly 30. Thus, the keeper bar, when engaged with the socket member and the clip assembly as shown in FIGS. 1 and 2, functions to secure the clip assembly to the socket member and to prevent boss 38 from moving, especially angularly, relative to the socket member.

When the keeper bar is fitted through side walls 22 and boss 38 in the manner above described, it causes plate 32 of assembly 30 to substantially fill the gap in inner surface 24 of recess 14 established by aperture 28. In other words, since the radius of curvature of plate 32 along portions 34 and 36 thereof conforms to that of recess inner surface 24, the fixing in position of plate 32 by bar 46 effectively completes a circle of substantially uniform radius around the center of recess 14.

The end of plate 32 opposite from boss 38 is defined by an S-shaped grip tab 48. Grip 48 extends away from convex outer surface 42 of plate 32 into, and even through aperture 28, if desired; preferably, however, the normal position of grip 48 is within aperture 28 (as shown in FIG. 2) which has substantial depth radially of the socket member in view of the substantial thickness of socket member walls 22. The extreme end of plate 32 opposite from boss 38 defines the terminal tab end of S-shaped grip 48 and is spaced from the wall of aperture 28 remote from recess 44. In this manner, sufficient room is left in aperture 28 for a person to insert a finger into the aperture to engage the tab end of S-grip 48 and pull it through aperture 28 away from recess 14.

As noted above, clip plate 32 is defined by a piece of thin spring steel. The configuration of plate 32 is such that when it is properly held in position by keeper bar 46, the teeth 50 (described below) carried by tooth portion 36 of the plate are biased by the inherent resilience of the plate into recess 14. In view of the foregoing description concerning grip 48, however, it is seen that a person may engage plate 32 to overcome such bias and move teeth 50 away from recess 14; aperture 28 is configured to facilitate such an operation.

As best shown in FIG. 6, portion 36 of plate 32 is arranged to define a plurality of teeth 50, the teeth preferably being formed integral with the plate to extend therefrom downwardly and outwardly from the concave surface of portion 36. Teeth 50 ride along the external threads 51 defined by the male component 52 of a coupling carried at one end of a length of drill pipe 53 when the male coupling component is advanced axially into socket member recess 14. Once socket member 12 is fitted over the pipe end, however, teeth 50 inhibit slippage of the pipe end relative to the socket member since they lock into the pipe threads. This is clearly shown in FIG. 6 wherein socket member 12 is fitted over the threads of a drill pipe male coupling component and is restrained from slipping axially off such end by teeth 50 being lockingly engaged with the threads of the drill string section end along only a small fractional portion of the circumference of the male coupling component. The angle of taper of the inner surface housing side walls 22, or the taper of conical recess 14, is arranged to match the taper of the male coupling component.

It is important to provide means for enabling the release of teeth 50 from engagement with the external threads carried by the end of a pipe received in socket member 12. This is accomplished with the aid of tapered aperture 28 which allows a person to reach in and pull on S-grip 48, thereby flexing plate 32 outwardly about the end of the plate fixed by keeper bar 46 and thus removing teeth 50 from engagement with the pipe threads. When such is done, socket 12 may be slid axially away from the pipe end easily and efficiently without the need for unscrewing as required with the prior art thread protectors described above.

It is also important to provide means for enabling the ready removability of spring clip assembly 30 for replacement purposes in the event that teeth 50 become worn. This is most easily accomplished, in the present invention, by providing a notch 54 in socket member side walls 22 at their upper end 16 at a portion thereof including the accommodating passage 47 for keeper bar 46. With such the case, as is clearly shown in FIGS. 1 and 4, a person may easily pull out bar 46, allowing clip assembly 30 to drop out into recess 14. Replacement of a clip assembly is just as easily accomplished by placing boss 38 of assembly 30 within corresponding recess 44 and then reintroducing bar 46 through side walls 22 and boss aperture 40.

Another important feature of the present invention is the fact that socket housing 12 preferably is molded of polyethylene or polypropylene and has substantial thickness adjacent the bottom of recess 14. Polyethylene and polypropylene are relatively resilient and shock absorbent. The ability of protector 10 to absorb shocks is extremely desirable in view of the foregoing description of the manner in which drill pipe lengths are routinely handled. In addition to providing an effective shield to pipe coupling threads, the protector of the present invention is much less expensive to fabricate than sheet metal protectors. Because it is made of polyethylene or a similar thermoplastic material, protector 10 is buoyant and can be recovered if dropped overboard from a floating drilling vessel. Also, by coloring the material from which socket member 12 is molded, the protector may be made in a variety of colors to enable color coding of drill pipe lengths.

Another thread protector 56, shown in FIG. 5, is similar to protector 10 in that has a housing socket member 12' containing a conical-shaped recess 14. Protector 56 also has a resilient clip assembly 58 which is defined by a curved spring steel plate 60 of radius of curvature essentially equal to that of the inner surface of socket member side walls 22. Plate 60, however, has a substantially rectangular flexing arm portion 62 essentially twice the elongate extent of portion 34 of plate 32. Additionally, the block-like boss 64, similar to boss 38 of assembly 30, is disposed in the center of arm portion 62 to extend laterally into a mated recess 63 formed into the side walls of recess 14.

Boss 64 is held fixed in recess 63 by a keeper bar 46 cooperating with a passage 47 defined through the socket member side walls as described above. At either end of clip assembly 58 is defined an essentially square-shaped portion 65, each similar to portion 36 of assembly 30 in that they each have a plurality of teeth 66 similar in shape and position to teeth 50 on portion 36 of plate 32. Thus, clip assembly is defined as having a pair of tooth portions 65. In other words, assembly 58 has twice the thread engaging qualities as does clip assembly 30, thereby decreasing the possibility of slippage of the protector relative from the pipe end once the pipe end is received in recess 14.

A pair of tapered apertures 68 and 70 are formed through the socket member side walls with the relief-tapered portion of each being defined by an inner surface 72 which extends from the corresponding aperture toward recess 63 to accommodate flexing of arm portions 62 as the protector is engaged with or removed from a pipe end. Each of apertures 68 and 70 are large enough to allow a person to reach in and pull back on the tab end of an S-grip 74 defined at either end of plate 60, each S-grip 74 being substantially identical to S-grip 48 of assembly 30.

In other words, clip assembly 58 may be viewed as two clip assemblies 30 connected together in end-to-end relation about a common retaining boss, socket member 12' being like socket member 12, except to the extent required to accommodate the different spring clip assembly.

As with clip assembly 30 of protector 10, clip assembly 58 may be easily removed from socket member 12' for replacement by removing the keeper bar 46 from its corresponding passage in the socket side walls and from aperture 67 through boss 63. Additionally, like protector 10, protector 58 is fabricated of shock absorbent, resilient polyethylene or polypropylene for maximum thread protection. Furthermore, as with protector 10, protector 58 is easily installed over a pipe end by sliding it axially thereover until the pipe end is fitted into the conical recess. Slippage out of the recess is thereafter restrained by the releasable locking engagement of teeth 66 with the threads. Protector 58 is axially removable from the pipe end by pulling on both S-grips 74 thereby releasing the teeth from engagement with the threads; such removal is facilitated by the fact that each set of teeth 66 engages the adjacent external pipe threads only along a small fractional part of the circumference of the pipe with which the protector is used.

What has been described, therefore, is an improved thread protector which is especially useful with drill pipe, is easily installed over and removed from a threaded pipe end, and which is highly shock absorbent and resilient for maximum protection of the threads. It will be appreciated, however, that the protector may assume forms other than those described above without departing from the scope of the invention, the illustrated forms being only presently preferred embodiments of the invention which have been illustrated for the purposes of explanation and example. Therefore, the foregoing description per se should not be regarded as limiting or exhaustively defining the scope of the invention.

What is claimed is:

1. A thread protector for protecting external threads of an end of a pipe length and the like comprising:
    a. a cylindrical socket member having a curved recess with a curved sidewall adapted to receive an externally threaded end of a pipe length, the recess having smooth walls whereby an externally threaded end of a pipe length is insertable into the recess by simple linear relative motion between the pipe length and the socket member, said socket member having an aperture through the side wall thereof to the recess;
    b. tooth means disposed in said aperture along a portion only of the circumference of the recess and configured to engage external threads of a pipe length received in the recess and to ride along the external threads during linear insertion of the pipe length into the recess,
    c. means disposed within the wall of the socket member and coupled to the tooth means for mounting the tooth means in said socket member for movement toward and away from the recess in said aperture substantially radially of the recess and for resiliently biasing the tooth means into the recess, and
    d. manually operable means connected with said tooth means disposed wholly within the wall of the socket member and accessible in said aperture for moving the tooth means away from the recess against the resilient bias to enable removal of the socket member from the threaded end of the pipe length by simple linear relative motion between the pipe length and the socket member without relative rotation therebetween.

2. A thread protector according to claim 1 including an elongate resilient clip member carrying the tooth means at one end thereof and disposed within the socket member to extend partially circumferentially of the recess, means cooperating between the clip member and the socket member within the socket member for removably yet fixedly connecting the clip member to the socket member at a location spaced from the tooth means.

3. A thread protector according to claim 2 wherein the manually operable means comprises a tab defined by the clip member accessible through the aperture for manual engagement.

4. A thread protector according to claim 2 wherein the clip member carries tooth means locally thereof at each of its opposite ends, and the clip member is removably yet fixedly connected intermediate its ends to the socket member.

5. A thread protector for protecting external threads on the pipe end of a pipe length or the like comprising:
  a. an open-ended socket member having a curved recess with a curved sidewall and adapted to receive an externally threaded end of a pipe length,
  b. tooth means disposed in the wall of said socket member for riding along the external threads of a pipe length as the same is introduced into the recess and for engaging the threads about only a portion of the periphery of a pipe length received in the recess to retain the pipe length in the recess,
  c. means disposed wholly within the wall of said socket member and removably mounting the tooth means in the socket member for movement of the tooth means toward and away from the recess and for resiliently biasing the tooth means into the recess, an arcuate clip member attached to said means and having:
    i. a curvature substantially matching the curvature of the sidewall of said recess,
    ii. a first portion at which the slip member is fixedly yet removably mounted in the wall of the socket member by said means, and
    iii. a second portion which is movable relative to said first portion and which carries the tooth means,
  d. an aperture defined through the socket member side wall aligned with the tooth means, the side wall being decreased in thickness from a first extent radially of the recess adjacent the clip member first portion to a lesser second extent radially of the recess adjacent the aperture for enabling movement of the second portion of the clip member toward and away from the recess in the aperture, and
  e. tab means carried by the clip member adjacent the tooth means and wholly within said aperture for manual engagement for moving the clip member second portion and the tooth mans away from the recess.

6. A thread protector according to claim 5 wherein the mounting means for the tooth means further comprises a passage formed in the socket member side wall and extending from adjacent the position of the clip member first portion within the socket member to an end of the socket member, a hole formed in the clip member at the first portion thereof and aligned with the passage in the operative position of the clip member within the socket member, and a keeper element mated within the passage and the hole for mounting the clip member to the socket member.

7. A thread protector according to claim 6 wherein the passage, the hole and the keeper element are of cooperating non-circular cross-sectional configuration.

8. A thread protector according to claim 6 wherein the socket member at end thereof defines a notch to which the passage opens and within which an end of the keeper element is disposed.

9. A thread protector according to claim 5 wherein the clip member is fabricated of a resilient material and provides the resilient bias of the tooth means into the recess.

* * * * *